(12) United States Patent
Leung et al.

(10) Patent No.: US 11,907,521 B2
(45) Date of Patent: Feb. 20, 2024

(54) AUGMENTED REALITY CALLING INTERFACE

(71) Applicant: SAMSUNG ELECTRONICS CO., LTD., Gyeonggi-Do (KR)

(72) Inventors: Sylvia Leung, San Jose, CA (US); Aaron Faucher, Seattle, WA (US); Jaehyun Kim, San Francisco, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/450,522

(22) Filed: Oct. 11, 2021

(65) Prior Publication Data
US 2022/0236846 A1 Jul. 28, 2022

Related U.S. Application Data

(60) Provisional application No. 63/142,986, filed on Jan. 28, 2021.

(51) Int. Cl.
*G06F 3/0486* (2013.01)
*G06F 3/0488* (2022.01)
(Continued)

(52) U.S. Cl.
CPC .......... *G06F 3/0486* (2013.01); *G06F 3/0488* (2013.01); *G06T 19/006* (2013.01);
(Continued)

(58) Field of Classification Search
CPC .... G06F 3/0486; G06F 3/0488; H04W 4/029; G06V 20/20; G06V 40/172; G06T 19/006
See application file for complete search history.

(56) References Cited

U.S. PATENT DOCUMENTS 8,743,145 B1 * 6/2014 Price .................. G06F 16/9535
345/631
10,013,805 B2 7/2018 Barzuza et al.
(Continued)

FOREIGN PATENT DOCUMENTS

CN 112291434 A 1/2021
CN 112489138 A 3/2021
WO WO-2022054574 A1 * 3/2022

OTHER PUBLICATIONS

Singh, Gurjinder, and Archana Mantri. "Ubiquitous hybrid tracking techniques for augmented reality applications." 2015 2nd International Conference on Recent Advances in Engineering & Computational Sciences (RAECS). IEEE, 2015. (Year: 2015).*

(Continued)

*Primary Examiner* — Andrew T Chiusano
(74) *Attorney, Agent, or Firm* — Cuenot, Forsythe & Kim, LLC

(57) ABSTRACT

A calling method can include determining, with a device, a position of a nearby device in response to detecting a signal transmitted from the nearby device and capturing, with a camera of the device, an image of an area near the device. Responsive to identifying an image of a call candidate appearing within the image of the area, a position of the call candidate can be determined from the image. The position of the call candidate can be correlated with the position of the nearby device based on proximity. Information associated with the call candidate can be retrieved based on the correlating. Based on the information retrieved, a visual identifier token corresponding to the call candidate can be generated. The visual identifier token can be presented on a display of the device and can be used by the user to initiate a call between the device and the nearby device.

20 Claims, 15 Drawing Sheets

(51) Int. Cl.
   *H04W 4/029* (2018.01)
   *G06V 20/20* (2022.01)
   *G06V 40/16* (2022.01)
   *G06T 19/00* (2011.01)

(52) U.S. Cl.
   CPC ............ *G06V 20/20* (2022.01); *G06V 40/172* (2022.01); *H04W 4/029* (2018.02)

(56) References Cited

U.S. PATENT DOCUMENTS

| | | | |
|---|---|---|---|
| 10,282,696 B1 | 5/2019 | Bettis et al. | |
| 10,515,114 B2 | 12/2019 | Petrou et al. | |
| 10,630,939 B2 | 4/2020 | Van Os et al. | |
| 10,936,894 B2 | 3/2021 | Yang et al. | |
| 2010/0251177 A1* | 9/2010 | Geppert | H04W 4/21 |
| | | | 709/206 |
| 2014/0011487 A1* | 1/2014 | Hwang | G06V 40/16 |
| | | | 455/556.1 |
| 2014/0328521 A1* | 11/2014 | Colangelo | H04L 67/52 |
| | | | 382/118 |
| 2019/0122045 A1* | 4/2019 | Ravi | H04L 67/306 |
| 2019/0179584 A1* | 6/2019 | Masters | G06F 3/147 |
| 2019/0354735 A1* | 11/2019 | Madhusudhana | G06V 10/255 |
| 2020/0234502 A1* | 7/2020 | Anderlecht | G06T 19/006 |
| 2020/0262931 A1* | 8/2020 | Resnick | G06V 20/49 |
| 2021/0209346 A1* | 7/2021 | Resnick | G06V 40/50 |

OTHER PUBLICATIONS

Gosda, Uwe, et al. "Target tracking in wireless sensor networks by data fusion with video-based object detection." 2013 10th Workshop on Positioning, Navigation and Communication (WPNC). IEEE, 2013. (Year: 2013).*

* cited by examiner

800

---

Determine with a device a position of a nearby device in response to detecting signal transmitted from the nearby device
802

↓

Capture with a camera of the device an image of area near the device
804

↓

Responsive to identifying an image of a call candidate appearing within the image of the area, determine, from the image, a position of the call candidate
806

↓

Correlate the position of the call candidate with the position of the nearby device based on a proximity of the position of the call candidate to the position of the nearby device
808

↓

Retrieve information associated with the call candidate based on the correlating
810

↓

Generate, based on the information, a visual identifier token corresponding to the call candidate, the visual identifier token presented on a display of the device to enable the user to initiate a call between the device and the nearby device
812

FIG. 8

AUGMENTED REALITY CALLING INTERFACE

CROSS-REFERENCE TO RELATED APPLICATIONS

This application claims the benefit of U.S. Provisional Patent Application No. 63/142,986 filed on Jan. 28, 2021, which is incorporated herein by reference in its entirety.

TECHNICAL FIELD

This disclosure relates to mobile communications, and more particularly, to facilitating mobile communications using augmented reality.

BACKGROUND

Wireless communication with a mobile device such as a cellular phone enables users to initiate, receive, and engage in telephone conversations from virtually any location. The convergence of telephony and computing in a single device has provided users even greater convenience. For example, a smartphone can store electronic data such as a contact list of individuals and their contact numbers that the smartphone user can consult to initiate a call with someone on the list.

SUMMARY

In an example implementation, a calling method using a device may include determining, with the device, a position of a nearby device in response to detecting a signal transmitted from the nearby device. The method may include capturing, with a camera of the device, an image of an area near the device. The method may include responding to identifying an image of a call candidate appearing within the image of the area by determining a position of the call candidate relative to the device, the position determined from the image. The method may include correlating the position of the call candidate with the position of the nearby device based on a proximity of the position of the call candidate to the position of the nearby device. The method may include retrieving information associated with the call candidate based on the correlating. The method may include generating, based on the information, a visual identifier token corresponding to the call candidate, the visual identifier token presented on a display of the device to enable the user to initiate a call between the device and the nearby device.

In another example implementation, a system includes a processor disposed in a device configured to initiate operations. The operations may include determining, with the device, a position of a nearby device in response to detecting a signal transmitted from the nearby device. The operations may include capturing, with a camera of the device, an image of an area near the device. The operations may include responding to identifying an image of a call candidate appearing within the image of the area by determining a position of the call candidate relative to the device, the position determined from the image. The operations may include correlating the position of the call candidate with the position of the nearby device based on a proximity of the position of the call candidate to the position of the nearby device. The operations may include retrieving information associated with the call candidate based on the correlating. The operations may include generating, based on the information, a visual identifier token corresponding to the call candidate, the visual identifier token presented on a display of the device to enable the user to initiate a call between the device and the nearby device.

In another example implementation, a computer program product includes one or more computer readable storage media, and program instructions collectively stored on the one or more computer readable storage media. The program instructions are executable by hardware of a device to initiate operations. The operations may include determining, with the device, a position of a nearby device in response to detecting a signal transmitted from the nearby device. The operations may include capturing, with a camera of the device, an image of an area near the device. The operations may include responding to identifying an image of a call candidate appearing within the image of the area by determining a position of the call candidate relative to the device, the position determined from the image. The operations may include correlating the position of the call candidate with the position of the nearby device based on a proximity of the position of the call candidate to the position of the nearby device. The operations may include retrieving information associated with the call candidate based on the correlating. The operations may include generating, based on the information, a visual identifier token corresponding to the call candidate, the visual identifier token presented on a display of the device to enable the user to initiate a call between the device and the nearby device.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 8 illustrates an example method of calling using an AR calling system.

DETAILED DESCRIPTION

Figure 1:
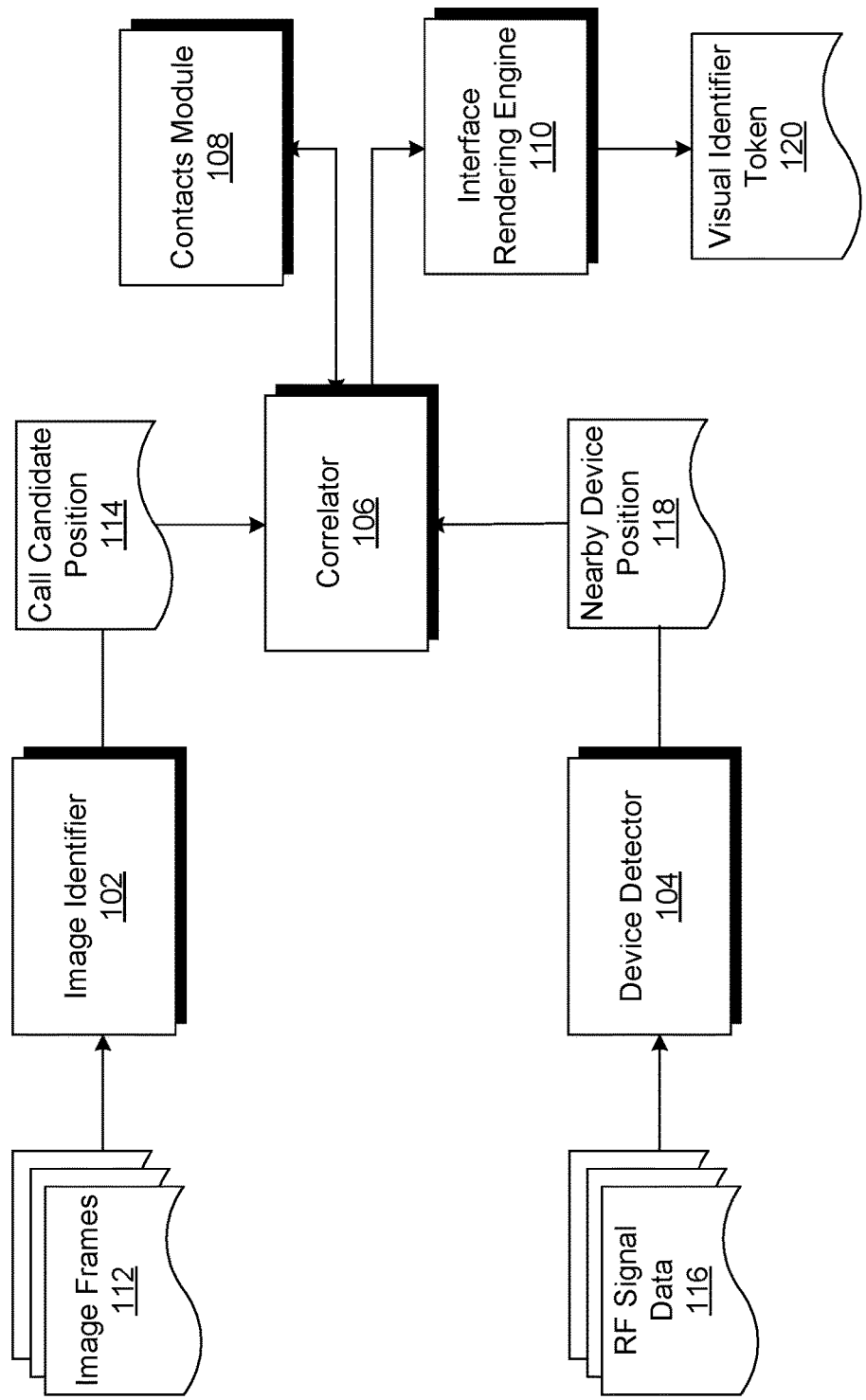
FIG. 1 illustrates an example augmented reality calling system.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to mobile communications, and more particularly, to facilitating mobile communications using augmented reality (AR). As noted, mobile devices increasingly merge communication and computing capabilities. For example, a user can electronically store a contacts list on the same mobile device with which the user initiates a call with a listed contact. Notwithstanding the convenience of the stored contact list, the user typically must nonetheless scroll through the list or initiate a device-implemented search for the contact before initiating the call. If the list is extensive, the necessity of a commensurately extensive search can diminish the convenience of the stored contact list. Moreover, in the context of a group call, consulting a contacts list to identify individuals to bring into the call is distracting and likely difficult, especially if the call is already in progress.

In accordance with the inventive arrangements described within this disclosure, example methods, systems, and computer program products are provided that are capable of initiating and managing a call, such as a short-range (SR) call, using an AR calling interface implemented in a mobile device. The AR calling interface can be implemented within a system that identifies user contacts (call candidates) by detecting individuals in an image frame generated with the mobile device. An individual appearing in the image frame can be identified by correlating the individual's image with a device nearby the individual. The position of the device can be determined from ranging measurements determined from RF signals.

The example implementations described herein may be implemented in example devices that include, but are not limited to, a mobile phone (e.g., smartphone), a handheld computing device (e.g., tablet), a wearable computing device (e.g., a smart-watch or smart glasses) or other type of mobile device. In one or more example implementations, the AR calling system implemented in the mobile device is capable of providing an interface for displaying contact indicia in an AR object—a visual identifier token—superimposed on an image captured by a camera of the device of a nearby scene that includes one or more persons—call candidates—that the device user may wish to call. The AR interface is capable of rendering the visual identifier token adjacent to or near the image of a corresponding person (call candidate) who appears in the camera-captured scene. The AR interface thus provides the device user visual capability for identifying nearby persons and for initiating and managing calls, such as SR calls, involving one or more of the nearby persons.

The visual capability, for example, can enable a ride-share driver to more readily locate the correct individual when picking up a passenger at a crowded airport. The visual capability can enable a gig worker to locate one or more individuals needed to complete a task, for example, or a big-box store employee to distinguish other employees from customers in order to wirelessly exchange notes or provide status updates. The visual capability, for example, can allow a player using an AR game application to identify others in the room who are participating in the AR game.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

Figure 14:
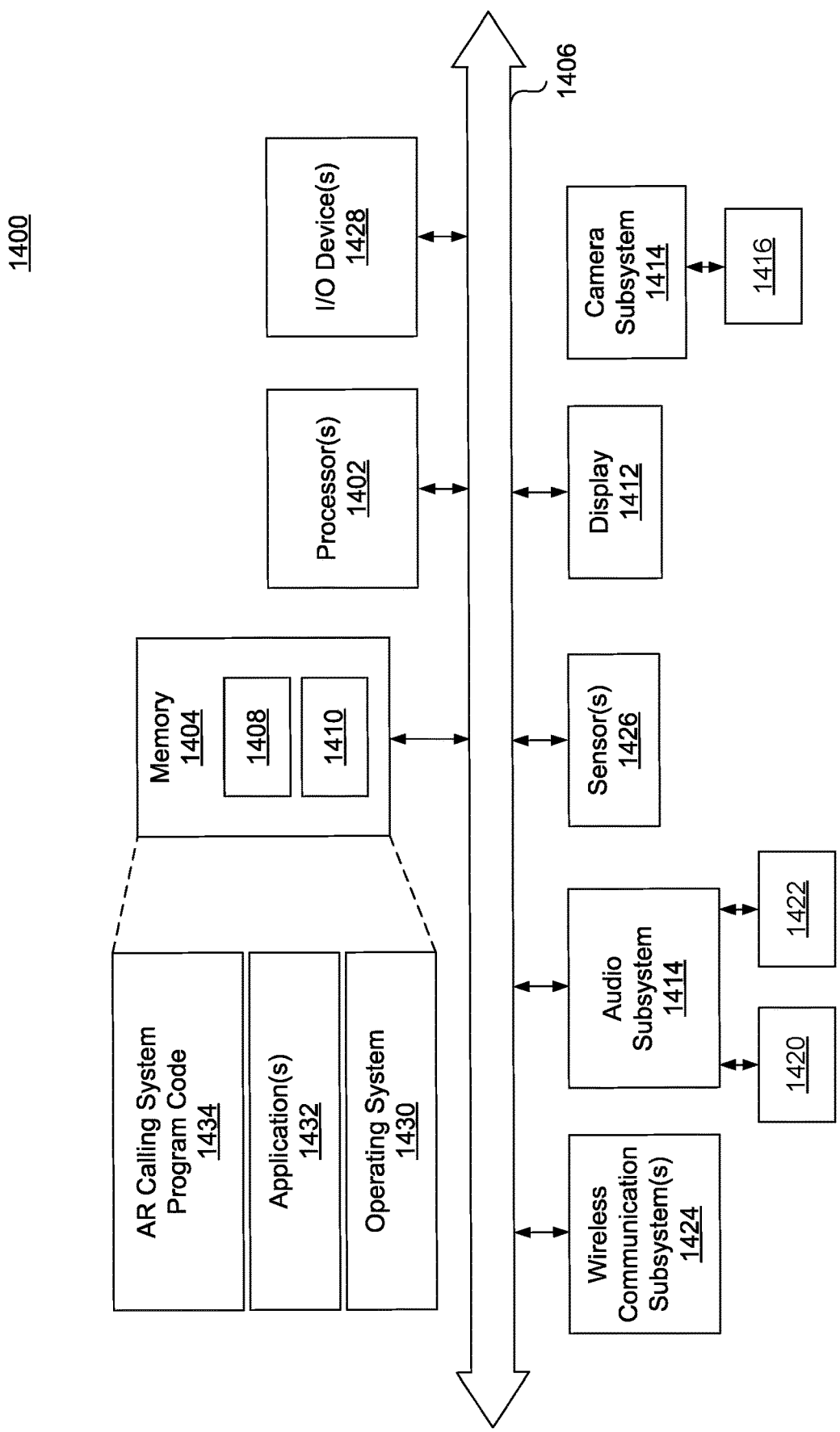
FIG. 14 illustrates an example device in which can be implemented using the system of FIG. 1.

FIG. 1 illustrates example AR calling system (system) 100. System 100 can be implemented in a device such as a mobile device (e.g., a smartphone), tablet, smart glasses, or other portable device that facilitates wireless calling with one or more other devices. The devices can include one or more of the components in the same or similar arrangement as those of example device 1400 (FIG. 14). Implemented in such a device, system 100 can be implemented in hardware (e.g., as dedicated circuitry), software (e.g., processor-executable program code), or a combination of hardware and software implemented in the device (e.g., smartphone, tablet, smart glasses). Operatively, system 100 provides a device user with an AR interface for initiating and managing calls using the device.

System 100, in some arrangements, includes image identifier 102, device detector 104, correlator 106, contacts module 108, and interface rendering engine 110. With system 100 implemented in a device, image identifier 102 is capable of determining a position of a call candidate from an image generated by a camera embedded in or operatively coupled with the device in which system 100 is implemented. A call candidate is a human person with whom the device user may wish to communicate via wireless calling.

Image identifier 102, in some arrangements, is implemented using an object detection algorithm executing on one or more processors (e.g., processors 1406) of the device. Using the algorithm, image identifier 102 can detect and classify objects that appear in image frames 112 captured with a camera subsystem (e.g., camera subsystem 1414) of the device in which system 100 is implemented, the camera subsystem having one or more optical sensors (e.g., optical sensors 1416) capable of performing camera functions such as recording or capturing one or more images and/or video. The functions and operations performed with system 100, as described herein, include updating the position of visual indicia in a sequence of images on a per-frame basis, such that a user's experience is the same as or similar to looking through a camera app whereby images and object positions update in real-time.

In certain embodiments, the object detection algorithm comprises a deep learning or multi-layer neural network (e.g., convolutional neural network) that is trained using supervised learning to take image frames 112 as input and identify objects within the image frames based on classifying the objects as belonging to one of a collection of predefined classes. Image identifier 102 uses the object detection algorithm to classify as a call candidate a human person that appears in the image of a scene near the device captured with the camera subsystem.

In response to detecting an image of a call candidate, image identifier 102 isolates the image of the call candidate. Image identifier 102, in certain embodiments, determines call candidate position 114 by identifying an image frame region of interest (ROI) in which an object (human person) is identified by the object detection algorithm. Call candidate position 114 is determined by image identifier 102 converting pixel coordinates of the image of the call candidate to corresponding physical coordinates of the call candidate. For example, image identifier 102 can determine a two-coordinate position (e.g., x-y axes of the Cartesian plane) of an object (call candidate) within an ROI of the image of the scene near the device. The physical position of the call candidate determined by image identifier 102, in 3D, can be represented by the x, y, z coordinates of a Cartesian coordinate system; the radius r, azimuth angle $\varphi$, and height z of the cylindrical coordinate system; or the radius $\rho$, azimuth angle $\varphi$, and polar angle $\theta$ of the spherical coordinate system. Using visual simultaneous localization and mapping (vSLAM), image identifier 102 can determine the position and orientation of the image call candidate with respect to other images (objects) within the image frame using only visual inputs from the camera subsystem.

Device detector 104 of system 100 is capable of determining the position of one or more nearby devices, for example a device within short-range calling distance of the device in which system 100 is implemented. RF signal data 116 received by the device in which system 100 is implemented can comprise a distance to the nearby device and angle of arrival (AOA) of a signal emanating from the nearby device. Based on RF signal data 116, device detector 104 determines nearby device position 118 corresponding to the nearby device. In certain embodiments, device detector 104 implements an ultra-wideband (UWB) service capable of determining the AOA of a signal transmitted by the nearby device and the distance between the nearby device and the device in which system 100 is implemented.

The nearby device in some embodiments transmits a signal advertising its presence to the device in which system 100 is implemented. For example, the advertising signal transmitted by the nearby device can be a Bluetooth signal. The device in which system 100 is implemented can respond by initiating the UWB session, which the nearby device joins. Upon joining the session, the nearby device transmits the UWB signal used by the device in which system 100 is implemented to locate the position of the nearby device.

Note that the determination of call candidate position 114 and nearby device position 118 are independent events, and accordingly, the operations performed by system 100 in determining the respective positions can occur in any order or simultaneously. For example, the user of the device in which system 100 is implemented can initially scan the surrounding environment to capture an image of a nearby scene that includes one or more persons. Upon the capture of an image from which image detector 102 identifies a call candidate, the operations of device detector 104 can be invoked to associate with the call candidate a nearby device. Alternatively, the device in which system 100 is implemented can transmit a signal invitation inviting a nearby device to transmit an acknowledgement, which when received, can prompt the user to scan the surrounding environment to capture one or more images of any persons located in the environment.

Correlator 106 is capable of correlating call candidate position 112 with nearby device position 118, the position of the nearby device. The correlation between call candidate position 114 and nearby device position 118, in certain embodiments, is based on the proximity of each with respect to the other. Proximity can be a predetermined maximum distance. That is, if the distance between call candidate position 114 and nearby device position 118 is within the predetermined maximum distance, correlator 106 associates the nearby device with the call candidate. Additionally, or alternatively, proximity can be measured as a relative distance. If multiple call candidates are identified by image identifier 102, correlator 106 associates the nearby device with the call candidate that is closest to the nearby device. Whether image detection or device detection occurs first, or whether both occur simultaneously, the subsequent operation of correlating call candidate position 114 with nearby device position 118 by correlator 106 is capable of linking the call candidate with a nearby device, based on which a call to the call candidate can be initiated by system 100.

In accordance with certain embodiments, if multiple images of call candidates are identified by image identifier 102 and multiple nearby devices are identified by device detector 104, correlator 106 performs an indexing operation to index the call candidates and nearby devices. Based on the indexing, correlator 106 can generate an indexed listing of call candidates and nearby devices. Correlator 106 is capable of indexing call candidates and nearby devices by performing different sorting procedures depending on the nature of the positional data available with respect to the multiple call candidates and nearby devices.

In certain embodiments in which 2D data is available, correlator 106 is capable of correlating call candidates and nearby devices based on the AOA of signals from each nearby device and the ROI pixels corresponding to images of the call candidates. In some arrangements, correlator performs a left-to-right sort of the AOA, and correspondingly, a left-to-right sort of the ROI pixels. For example, assume that for three devices, the AOAs of device 1, device 2, and device 3 are, respectively, 1.33 radians, 1.78 radians, and 1.88 radians. Assume, for example, the image ROI pixels of call candidate A, call candidate B, and call candidate C are, respectively, 126, 245, and 329. Implementing the left-to-right sort, correlator 106 associates device 1 with call candidate A, device 2 with call candidate B, and device 3 with call candidate C.

In certain embodiments in which 3D data is available, correlator 106 is capable of correlating call candidates and nearby devices based on vector distance sorting. Correlator 106 transforms the call candidates' positions determined by image identifier 102 and the device positions (e.g., distance and AOA) determined by device detector 104 into coordinates of a uniform coordinate system. The distance between each call candidate and each device is measured by correlator 106. For example, again assuming three call candidates and three nearby devices, the respective distances can be represented by a 3×3 matrix:

$$\begin{pmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{pmatrix}$$

where $α_{ij}$ is the distance between the i-th call candidate and the j-th device. Correlator 106 selects the minimum distances and associates call candidates and devices accordingly.

Whether 2D or 3D data is available can determine on the operating system of the device in which system 100 is implemented. If a device has a capability only to generate 2D data, then the relative size of the ROI can be used as a proxy for distance from device's camera. Though possibly less robust than methods using 3D data, the reliability of using ROI as a proxy may be enhanced by time-series analysis of ROI sizes collected over sufficient time.

Correlator 106, based on the correlation of call candidate position 114 with nearby device position 118, is capable of retrieving information associated with the call candidate, the information retrieved from contacts module 108. The information can be retrieved using an electronically stored device identifier of the nearby device. The device identifier can correspond to contact information, including a name and other data and/or metadata associated with the person linked to the identified nearby device. Thus, again, whether an image of a person or a location of a device is determined first, the process of determining a likely pairing of the two follows from the procedure performed by correlator 106.

Interface rendering engine 110, based on the information retrieved from contacts module 108, is capable of generating visual identifier token 120. Visual identifier token 120 corresponds to the call candidate, identified according to correlator 106's correlation of call candidate position 114 and nearby device position 118. Visual identifier token 120 can be rendered on a display of the device in which system 100 is implemented. On the display, visual identifier token 120 can be positioned adjacent or near to an image of the call candidate. The image of the call candidate can appear in an image of current scene captured by a camera of the device in which system 100 is implemented. Alternatively in certain arrangements, if the call candidate does not appear in the image of a scene captured with the device, interface rendering engine 110 can perform an electronic search of contacts module 108 for a photograph of the call candidate. If available in the contacts module, the photograph can be juxtaposed in the current scene image by interface rendering engine 110. Visual identifier token 120 can also include information corresponding to the call candidate. Additionally, visual identifier token 120 can enable the user to initiate a call to the nearby device. For example, if the display on which the visual identifier token 120 is rendered is a touchscreen, then touching the visual identifier token 120 can initiate the call. The call can be initiated automatically in response to user input (e.g., tapping a call button). In an arrangement in which a calling number associated with the call candidate is electronically stored in contacts module 108, system 100 can automatically place a call to the calling number associated with the call candidate.

The call, given that the call candidate is nearby the device in which system 100 is implemented, can be an SR call effected with the device directly using RF signaling based, for example, on the Wi-Fi, Bluetooth, or ultra-wideband protocol. Because the various devices in which system 100 can be implemented include, for example, mobile devices (e.g., smartphones), the call also can be carried over a cellular or other network. In certain embodiments, system 100 can be configured to receive user input specifying the mode of automatic calling, whether SR or other mode. Optionally, in addition to automatic calling in response to user input (e.g., tapping a call button), the user can use information electronically stored in contacts module 108 and presented in the visual identifier token 120 to manually place a call.

Figure 2:
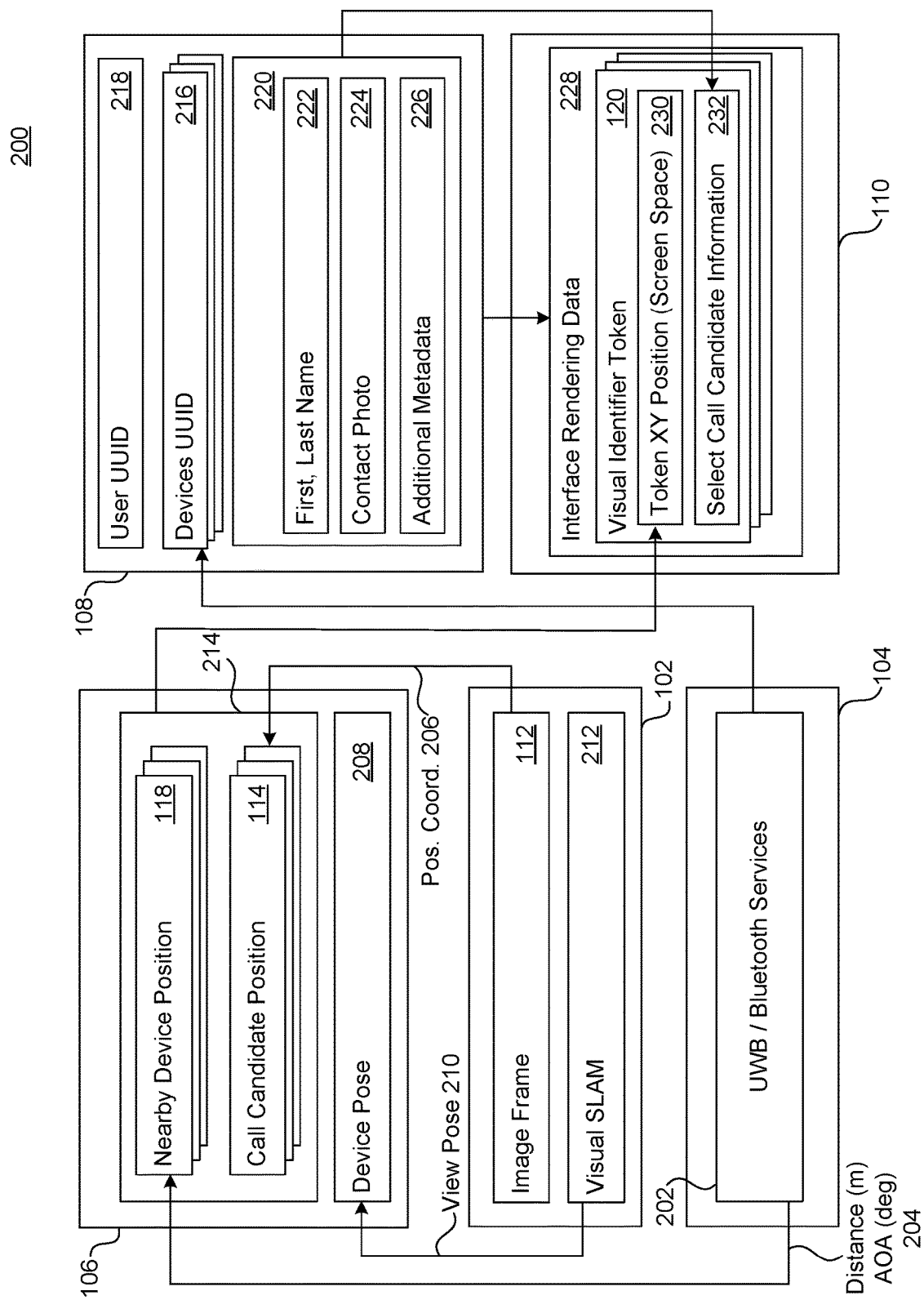
FIG. 2 illustrates certain operative features of the system in FIG. 1.

Referring additionally to FIG. 2, certain operative features of image identifier 102, device detector 104, correlator 106, contacts module 108, and interface rendering engine 110 implemented in mobile device 200 are illustrated in accordance with certain embodiments. Illustratively, device detector 104 implements both Bluetooth and UWB services 202. In response to a Bluetooth signal received by device 200 from a nearby device (not shown), device detector 104 determines nearby device position 118 based on a UWB-determined distance and AOA 204. Image detector 102 based on image frame 112 determines position coordinates (pos. coord.) 206 of call candidate position 114. Image detector 102 also determines device pose 208, based on view pose 210 generated with vSLAM 212 implemented by device detector 104. Correlator 106 performs correlation 214 based on call candidate position 114 and device position 118, thereby linking a call candidate and a nearby device.

Contacts module 108 illustratively includes 128-bit universally unique identifiers (UUIDs), both device UUIDs 216 and user UUIDs 218. In certain embodiments, a call candidate appearing in an image can be identified by name by correlating the UUID of nearby device with a user UUID. The identity of the call candidate is assumed to be the same as the person whose name is associated with the nearby device that correlator 106 linked to the call candidate. Illustratively, information 220 associated with a call candidate includes first and last name 222, contact photo 224, and additional metadata 226. Information 220 is conveyed from contacts module 108 to interface rendering engine 110 and combined with interface rendering data 228 to generate visual identifier token 120. Interface rendering data 228 illustratively includes token XY position 230 (screen space coordinates). Interface rendering engine 110 uses token XY position 230 to position visual identifier token 120, which optionally includes selected portions of information 220, adjacent or near the portion of an image corresponding to the ROI in which the image of the call candidate appears.

Figure 3:
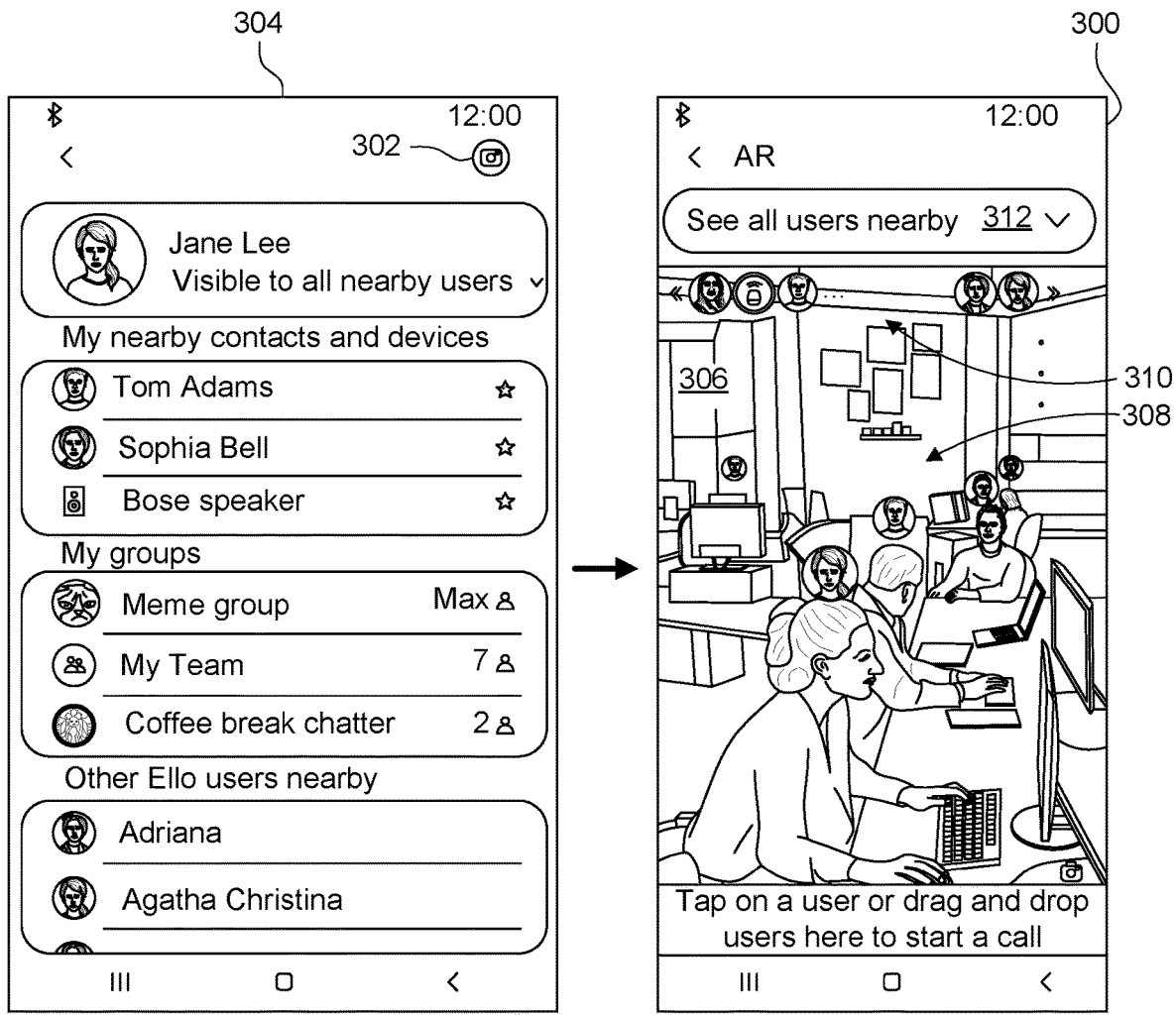
FIG. 3 illustrates certain aspects of an augmented reality interface implemented with the system of FIG. 1.

FIG. 3 illustrates example AR interface 300 rendered by interface rendering engine 110. AR interface 300 is illustratively rendered on a touchscreen of a mobile device in which system 100 is implemented. Illustratively, AR interface 300 is invoked when a user touches or taps icon 302, which initially appears on screen display 304. In response to the user touching or tapping icon 302, system 100 performs the above-described operations for correlating call candidates with nearby devices. Interface rendering engine 110, based on the correlations, generates visual identifier tokens, which interface rendering engine 110 overlays on image frame 306 of a nearby scene captured by a camera (e.g., front-facing camera) of the device in which system 100 is implemented.

Visual identifier tokens 308 are photographs retrieved from contacts module 108. Visual identifier tokens 308 correspond to identified call candidates who appear in camera-captured scene 306 shown on AR interface 300. Interface rendering engine 110 can vary the size of visual identifier tokens 308 according to the nearness of the call candidates relative to the device in which system 100 is implemented. Visual identifier tokens 310 correspond to call candidates whose images do not appear in camera-captured scene 306 shown on AR interface 300. Because the call candidates do not appear in scene 306, the only way for making an identification is to determine based on RF signaling that a device linked to the call candidate is nearby. The link can be established, for example, based on a UUID of the call candidate that is linked to the UUID of a device that though out of view is nevertheless determined to be nearby. There is, however, a likelihood that although the call candidate does not appear in scene 306, because a device linked to a call candidate is nearby, the call candidate is also nearby. Optionally, therefore, interface rendering engine 110 can overlay on scene 306 a visual identifier token comprising a previously acquired photograph or other information retrieved from contacts module 108 and corresponding to the call candidate linked to the nearby device.

A visual identifier token corresponding to the call candidate linked to the nearby device can include an indicator (e.g., an arrow, not shown) indicating a direction relative to the viewpoint of scene 306 at which a nearby device is positioned off-camera. Illustratively in AR interface 300, visual identifier tokens 310 are photographs retrieved from candidate module 108 and are photographs of call candidates whose images do not appear in scene 306 but whose phones—identified from RF signaling—are nearby, though currently out of view.

Optionally, AR interface 300 includes filter selector 312. Filter selector 312 enables the user to select a filter applied by interface rendering engine 110. Interface rendering engine 110, based on the filter selected by the user, can render visual identifier tokens of all nearby call candidates or only certain call candidates selected according to information retrieved from contacts module 108. In other embodiments, interface rendering engine 110 can apply other filters. For example, interface rendering engine 110 can apply a filter so as to render on the screen visual identifier tokens corresponding to call candidates currently speaking. Whether a candidate is speaking can be determined by the device in which system 100 is implemented (once candidates are connected into a call) making the determination based on the relative amplitude of microphone-captured voice signals from another device and correlating a "speaking/not speaking" status via user IDs back to AR interface 300, with filter selector 312 filtering a visual identifier token to indicate who is currently speaking based on the correlated status.

In certain embodiments, a call candidate's availability can be determined by system 100 linking to a third-party app running on the call candidate's device. For example, a messaging app can indicate whether a call candidate is available, in a meeting, busy, at lunch, on vacation, or the like. If system 100 has the appropriate permissions, the availability can be determined via the app's API, for example.

Figure 4:
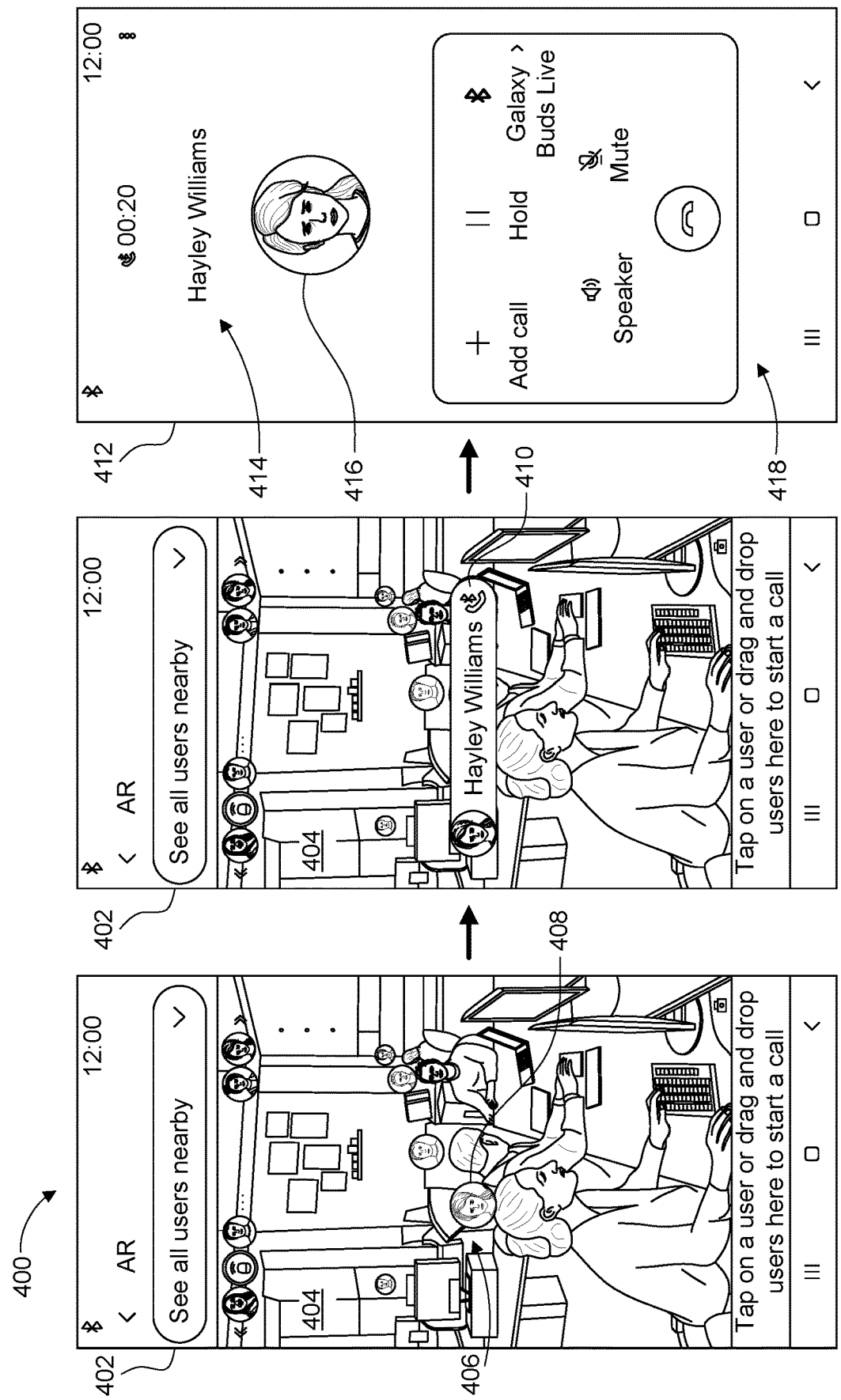
FIG. 4 illustrates certain aspects of an augmented reality interface implemented with the system of FIG. 1.

FIG. 4 illustrates example AR interface 400 rendered by interface rendering engine 110 for initiating a call (e.g., SR call) with a call candidate. Initially, interface rendering engine 110 renders screen 402, which displays nearby scene 404 upon which interface rendering engine 110 superimposes a plurality of visual identifier tokens 406 corresponding to nearby call candidates. Interface rendering engine 110, in response to the user touching the screen where visual identifier 408 is positioned, retrieves from contacts module 108 information (name) corresponding to the call candidate and superimposes visual identifier token 410, which is a modified version of visual identifier token 408 that includes the information (name) adjacent the photograph of the call candidate along with a calling icon. Screen 412 is invoked by the user touching visual identifier token 410. Screen 412 illustratively includes name 414 of the call candidate, photograph 416 of the call candidate, and calling interface 418, with which the user is able to initiate and manage a call involving the call candidate.

Figure 5A:
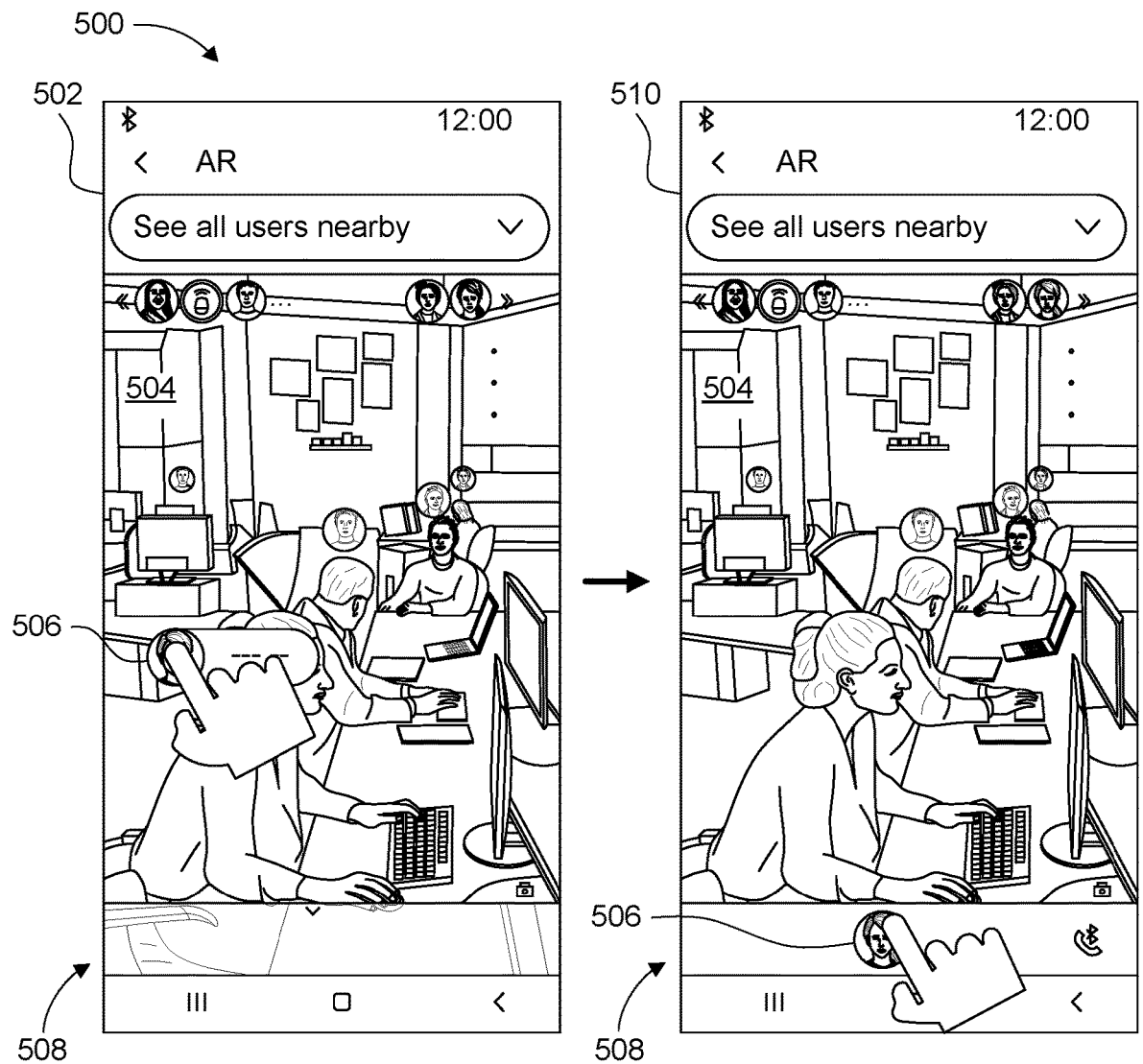
FIG. 5 illustrates certain aspects of an augmented reality interface implemented with the system of FIG. 1.
Figure 5B:
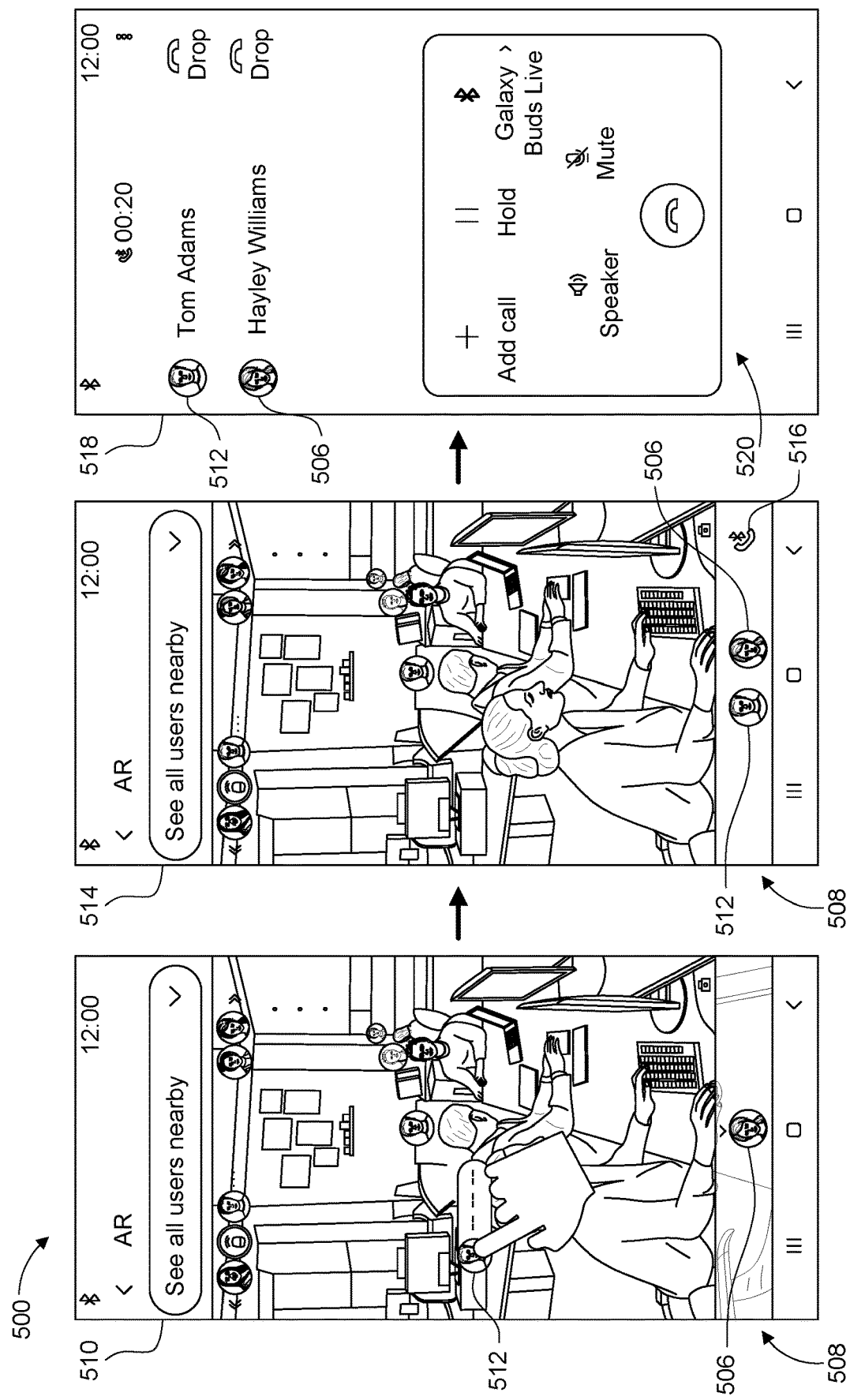

FIGS. 5A and 5B illustrate an example rendering of an AR interface 500 by interface rendering engine 110 for initiating a multi-party call (e.g., SR call) involving multiple call candidates. Interface rendering engine 110 renders screen 502, which displays nearby scene 504 on which visual identifier token 506 is superimposed. The user illustratively drags and drops visual identifier token 506 to calling bucket 508, as illustrated by the transition from screen 502 to screen 510. System 100 is capable of setting up a multi-party call (e.g., SR call) in response to the user's dragging and dropping more visual identifier tokens to calling bucket 508. Illustratively, the user drags and drops visual identifier token 512 (FIG. 5B) to calling bucket 508 as illustrated by the transition from screen 510 to screen 514. When the user has added to calling bucket 508 a visual identifier token for each call candidate the user wishes to call, the user illustratively touches call icon 516. The user's touching call icon 516 invokes a transition from screen 514 to screen 518, in which interface rendering engine 110 renders visual identifier tokens 506 and 512 along with calling interface 520 for initiating and managing the multi-party call.

Figure 6:
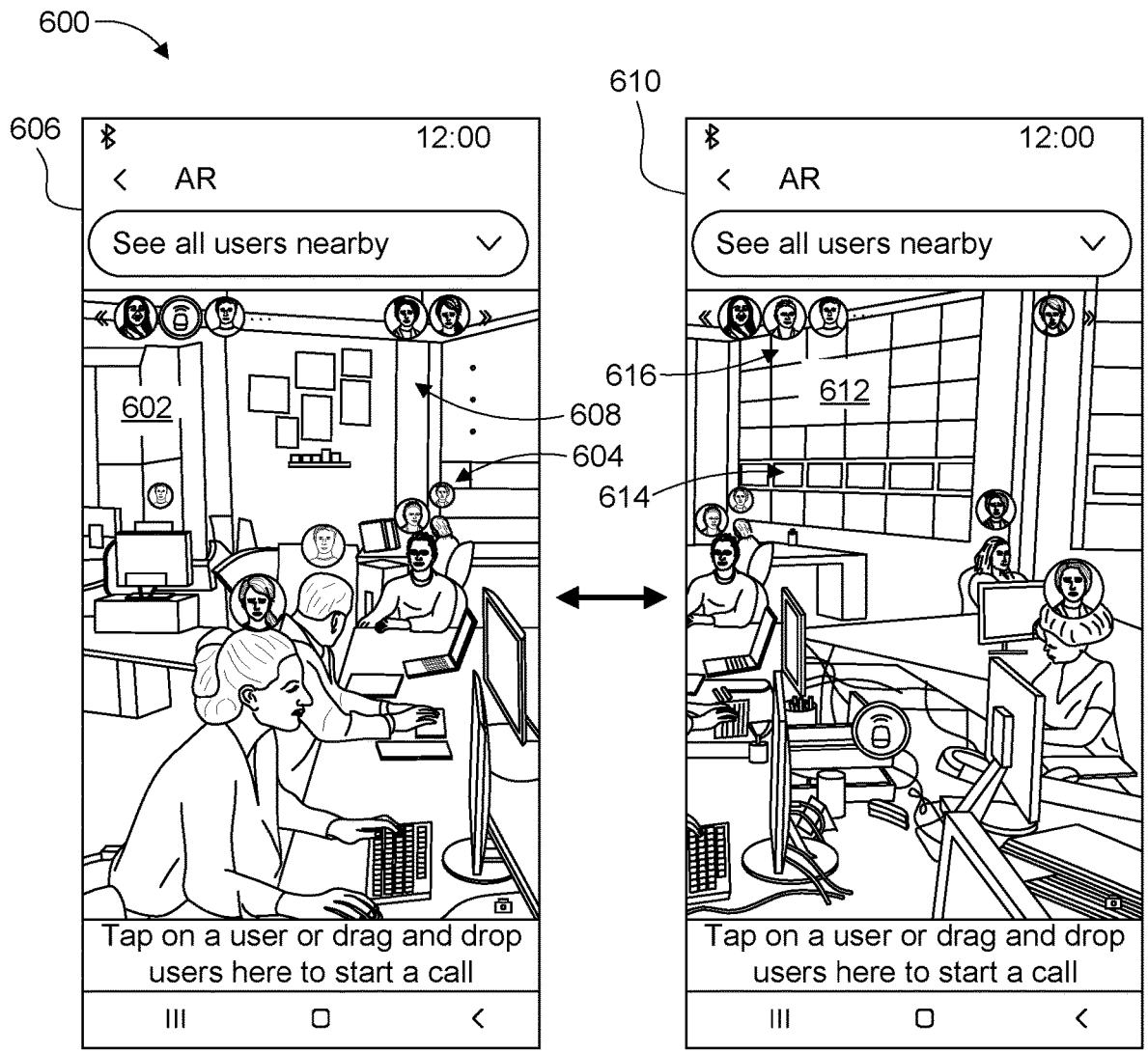
FIG. 6 illustrates certain aspects of an augmented reality interface implemented with the system of FIG. 1.

FIG. 6 illustrates an image panning capability of system 100, in accordance with certain embodiments. In accordance with some embodiments, system 100 is capable of changing the presentation of visual identifier tokens in real-time as the view of a camera of the device in which system 100 is implemented changes. Illustratively, AR interface 600 initially shows nearby scene 602 in which interface rendering engine 110 superimposes visual identifier tokens 604. Visual identifier tokens 604 correspond to call candidates who appear in scene 602. Note that visual identifier tokens 604 are arrayed adjacent the respective call candidate to which each corresponds and that the size of each visual identifier token varies with the position of the call candidate in scene 602. For example, the size of a visual indicator is larger the nearer the call candidate is to the camera. Screen 606 also includes visual identifier tokens 608 superimposed onto scene 602. Visual identifier tokens 608 correspond to call candidates who are out of view of the camera and do not appear in scene 602. As the user pans the camera, screen 606 transitions to screen 610, in which the camera captures scene 612. Visual identifier tokens 614 correspond to call candidates who were previously out of view and are now in view. They appear in scene 612 with their corresponding visual identifier tokens superimposed adjacent to or near their images appearing in scene 612. Visual identifier tokens 616 correspond to call candidates that were formerly in view and are now out of view, though still nearby. Visual identifier tokens 616 are arrayed along a border of the scene 612 near the top of screen 610.

Figure 7:
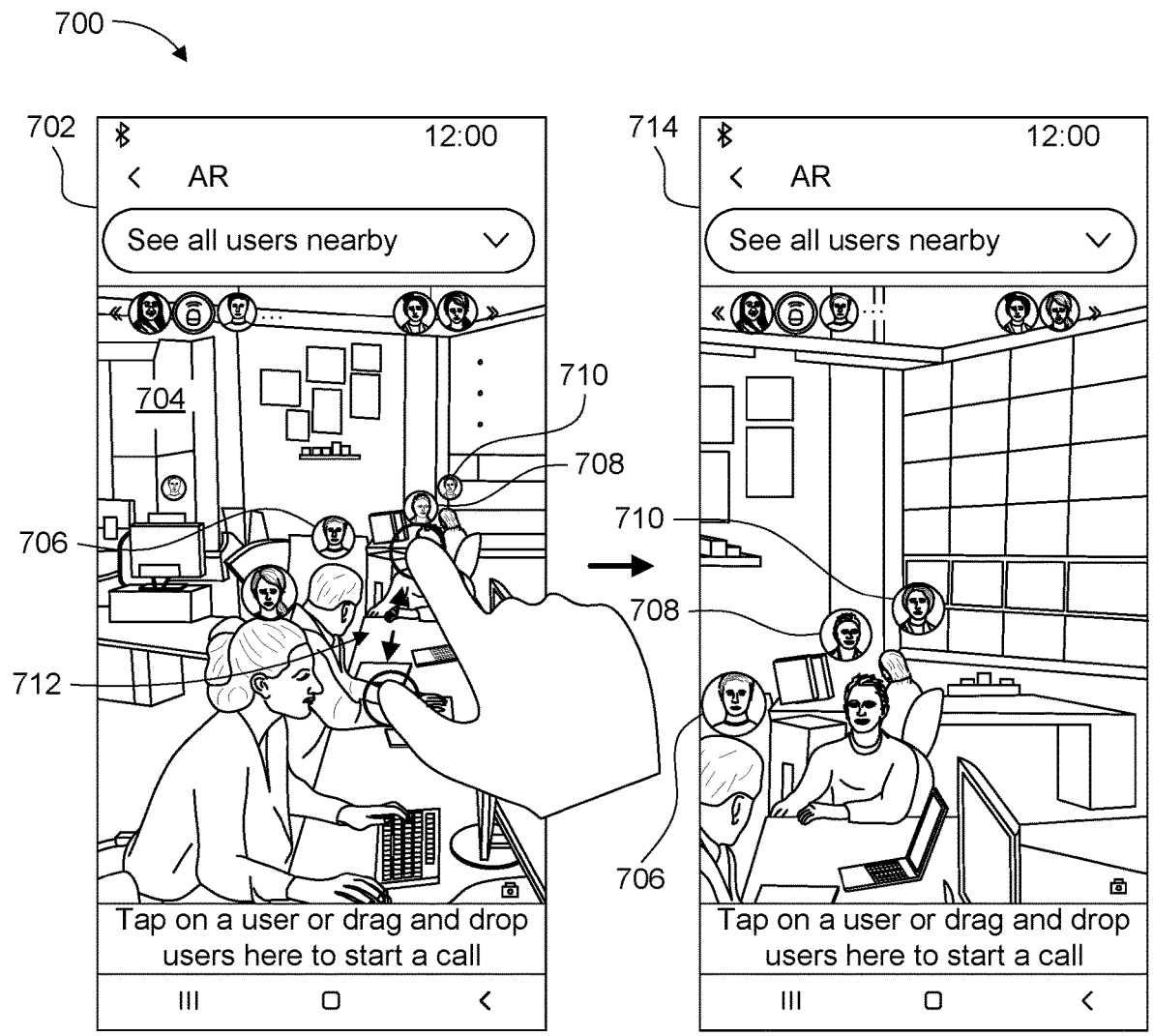
FIG. 7 illustrates certain aspects of an augmented reality interface implemented with the system of FIG. 1.

FIG. 7 illustrates an image zoom capability of system 100, in accordance with certain embodiments. Initially, interface rendering engine 110 renders AR interface 700. Screen 702 is displayed on a touchscreen of the device in which system 100 is implemented. On screen 702, interface rendering engine 110 renders scene 704 on which visual identifier tokens are superimposed, including visual identifier tokens 706, 708, and 710. Visual identifier tokens 706, 708, and 710 correspond to call candidates whose images appear in scene 704 but are relatively distant. In certain arrangements in which system 100 is implemented in a device having a touchscreen, interface rendering engine 110 responds to touch gestures. Illustratively, with movement 712 the user widens the distance between two fingers (e.g., thumb and index finger). In response, interface rendering engine 110 zooms the camera image, rendering screen 714 in which the images of the formerly remote call candidates are enlarged.

Simultaneously, interface rendering engine 110 enlarges visual identifier tokens 706, 708, and 710 commensurate with the enlarged screen image.

FIG. 8 illustrates example method 800 for implementing an AR calling system. Method 800 can be performed by a device that implements an AR calling system that is the same as or similar to the system described with reference to FIGS. 1-7. The device and AR calling system are referred to, collectively, as "the system."

At block 802, the system determines with the device a position of a nearby device in response to detecting a signal transmitted from the nearby device. The system at block 804 captures with a camera of the device an image of an area near the device. At block 806, the system determines a position of a call candidate in response to identifying an image of the call candidate appearing within the image of the area. The system at block 808 correlates the position of the call candidate with the position of the nearby device based on a proximity of the position of the call candidate to the position of the nearby device.

At block 810, the system retrieves information associated with the call candidate based on the correlating. The system block 812 generates, based on the information, a visual identifier token corresponding to the call candidate. The system can present the visual identifier token on a display of the device to enable the user to initiate a call between the device and the nearby device using the visual identifier token.

The image of the area near the device can be a second image of a second area, captured subsequent to the system using the device camera to capture a first image of a first area near the device. Method 800, accordingly, can include the system determining that the position of the nearby device is outside the first area. The system can respond by presenting on the display of the device an arrow directed toward the position of the nearby device with respect to the viewpoint of the first image.

In accordance with some aspects of method 800, the visual identifier token is presented by the system on the device display as an overlay in close proximity to the image of the call candidate. The visual identifier token can include selected portions of the information associated with the call candidate. The information can comprise, for example, a photograph of the call candidate that is electronically stored on the device.

In accordance with certain embodiments of method 800, the system is capable of determining the position of the nearby device using a UWB service initiated by the system detecting the signal transmitted from the nearby device. In accordance with other embodiments, the system is capable of determining the position of the nearby device based on an advertising signal indicating the position of the nearby device and wherein the determining is based on an advertising signal transmitted by the nearby device.

The system, in implementing method 800 according to some embodiments, cross-references the image of the call candidate against a collection of photographs electronically stored on the device. The call candidate is identified by the system performing facial recognition locally on the device, the identifying in response to matching the image of the call candidate in the nearby scene with another image of the call candidate appearing in one or more of the electronically stored photographs.

In certain embodiments, method 800 is implemented in a device having a touchscreen for displaying the visual identifier token. Accordingly, the system can change a screen position and/or image size of the visual identifier token in response to a user's tactile input via the touchscreen.

If the nearby area includes multiple call candidates and multiple nearby devices, the system as part of performing method 800 is capable of correlating each call candidate's position with a position of a nearby device. Based on the correlating the system can generate and present on a display of the device multiple visual identifier tokens, each uniquely corresponding to one of the call candidates. In certain arrangements in which the system is implemented in a device having a touchscreen, the user selects visual identifier tokens by dragging and dropping the visual identifier tokens to a calling bucket presented on the display of the device. The system can initiate a call between the device and each nearby device associated with the two or more visual identifier tokens added to the calling bucket.

In certain embodiments, the system in implementing method 800 is capable of generating a subset of call candidates by filtering multiple call candidates. The filtering can be based, for example, on a distance between the device and that of each nearby device associated with a call candidate. The filtering can be based, for example, on contact information corresponding to each of the call candidates associated with each of the nearby devices. The filtering can be based on a determination of whether a call candidate associated with a nearby device is currently speaking. The system can present on the display of the device each visual identifier token corresponding to one of the subset of call candidates selected through filtering. The user thus can select two or more of the visual identifier tokens corresponding to the subset of call candidates by adding the two or more visual identifier tokens to a calling bucket presented on the display of the device and can initiate a group call between the device and each nearby device associated with the two or more visual identifier tokens.

Figure 9:
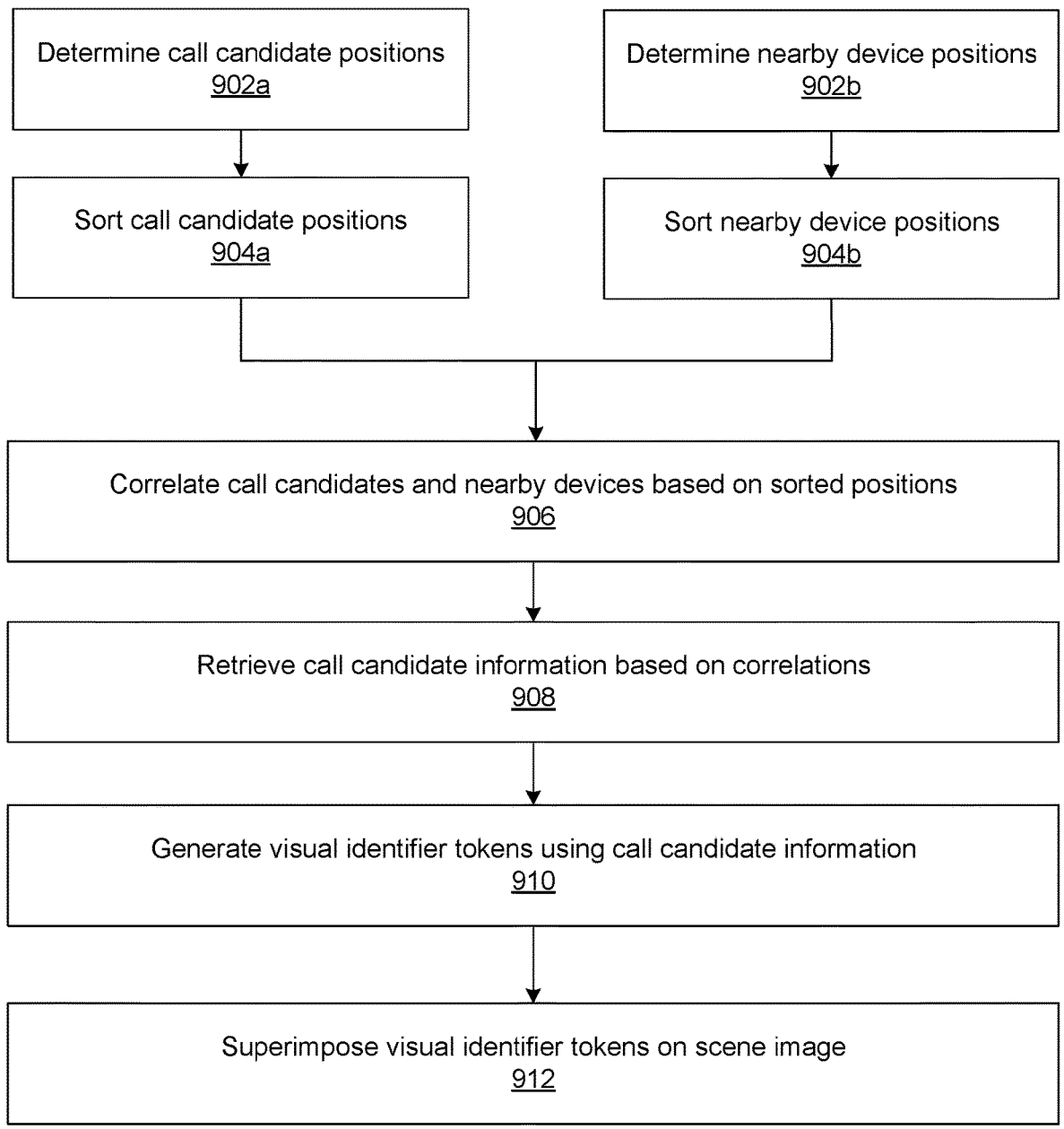
FIG. 9 illustrates an example method of rendering an AR interface for initiating and managing calls.

FIG. 9 illustrates example method 900 for generating an AR interface by correlating call candidates and nearby devices. Method 900 can be performed by a device that implements an AR calling system that is the same as or similar to the system described with reference to FIGS. 1-7. The device and AR calling system are referred to, collectively, as "the system."

At block 902a, the system determines call candidate positions from images of a scene captured by a camera of a device in which the system is implemented. At block 902b, the system determines positions of nearby devices based on RF signaling. Note that the determinations can be made in any order or simultaneously. At block 904a, the system sorts the call candidate positions, and at block 904b sorts the nearby device positions. At block 906, the system correlates each call candidate with a nearby device by matching sorted call candidate positions and nearby device positions. The system at block 908 retrieves electronically stored candidate information for each call candidate, the call information corresponding to an identity of the call candidate determined from data associated with a nearby device that correlates with the call candidate. At block 910, the system generates visual identifier tokens for each call candidate using the candidate information. The system at block 912 generates an AR interface by superimposing the visual identifier tokens on the camera-captured scene, positioning each visual identifier token adjacent or nearby a system-identified ROI that contains an image of the call candidate to which the visual identifier token corresponds. A screen space offset can be applied to avoid occluding the face of a call candidate's image with a corresponding visual identifier token. Optionally, the call candidate's face position in the ROI can be used as an offset basis.

Figure 10:
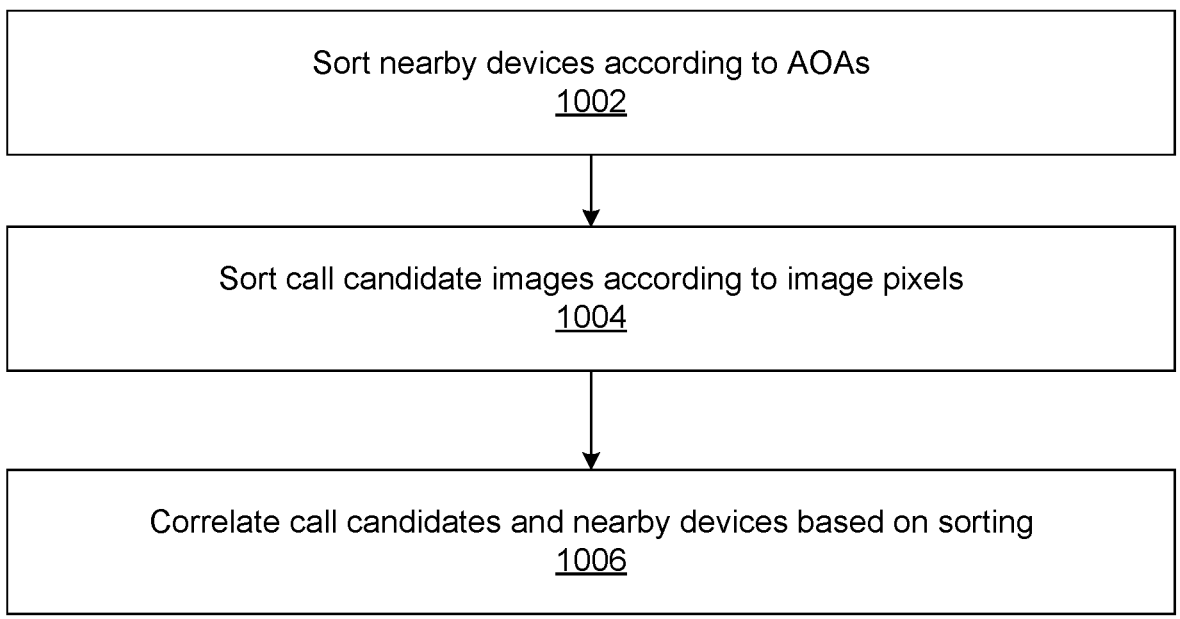
FIG. 10 illustrates an example method for correlating call candidates and nearby devices in an AR calling system.

FIG. 10 illustrates example method 1000 for correlating call candidates and nearby devices by an AR calling system. Method 1000 can be performed by a device that implements an AR calling system that is the same as or similar to the system described with reference to FIGS. 1-7. The device and AR calling system are referred to, collectively, as "the system."

At block 1002, the system can sort signal-determined positions of nearby devices by sorting from low to high the AOAs of signals emanating from the nearby devices. For example, the nearby devices can be sorted in accordance with a low-to-high arranging of corresponding AOAs. At block 1004, the system can sort call candidate images detected in a camera-captured scene based on the image pixels. For example, each image of a call candidate can be arrayed according to a left-to-right arrangement of pixels of each image. The system at block 1006 can correlate the call candidates with the nearby devices based on the sorting. For example, sorting nearby devices according to AOA and call candidate image according to pixels, enables the system to correlate the nearby device having the smallest AOA with the call candidate image corresponding to the left-most pixels, and so on. The system can determine, based on RF signals, that a given device is not captured in an image frame. Accordingly, the system disregards the device in performing the sorting process.

Figure 11:
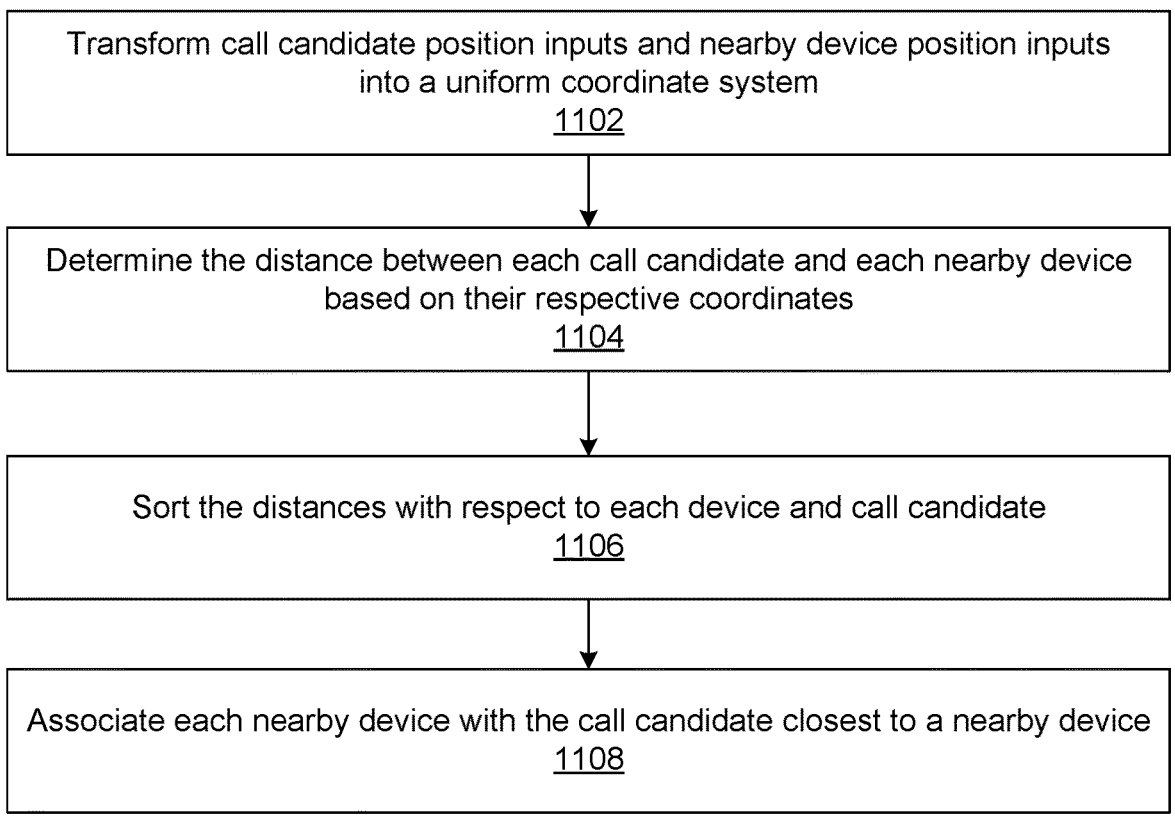
FIG. 11 illustrates an example method for correlating call candidates and nearby devices in an AR calling system.

FIG. 11 illustrates example method 1100 for correlating call candidates and nearby devices by an AR calling system. Method 1100 can be performed by a device that implements an AR calling system that is the same as or similar to the system described with reference to FIGS. 1-7. The device and AR calling system are referred to, collectively, as "the system."

At block 1102, the system transforms call candidate position inputs and nearby device position inputs into a uniform coordinate system. The system at block 1104, determines a distance between each call candidate and each nearby device based on their respective coordinates. At block 1106, the system sorts the distances with respect to each device and call candidate. The system at block 1108, based on sorted distances, correlates the call candidates with nearby devices by associating with each nearby device the call candidate closest to a nearby device.

Figure 12:
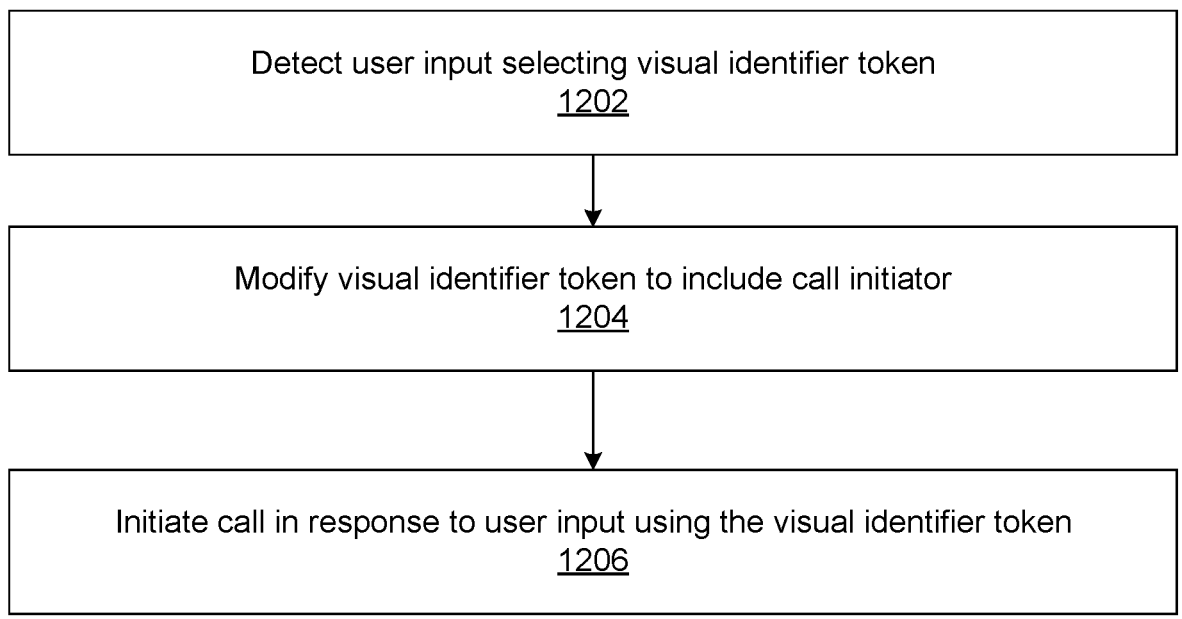
FIG. 12 illustrates an example method of initiating a call with an AR calling system.

FIG. 12 illustrates example method 1200 for initiating a call using an AR calling system. Method 1200 can be performed by a device that implements an AR calling system that is the same as or similar to the system described with reference to FIGS. 1-7. The device and AR calling system are referred to, collectively, as "the system."

At block 1202, the system is capable of detecting a user input selecting a visual identifier token. For example, implemented in a device having a touchscreen, the system can detect a single user touch (e.g., screen tap) in a region of the touchscreen in which a visual identifier token is overlaid on an underlying screen image. At block 1204, the system modifies the selected visual identifier token to include a call initiator (e.g., screen call button). Optionally, the selected visual identifier token can be modified to also include call information. Call information can be retrieved from a contacts module electronically stored on the device in which the system is implemented. The system optionally increases the size of visual identifier token. At block 1206, the system initiates a call to a call candidate corresponding to the visual identifier token, initiating the call using the visual identifier token. For example, using a device have a touchscreen, the user initiates the call by touching the call button included in the visual identifier token.

Figure 13:
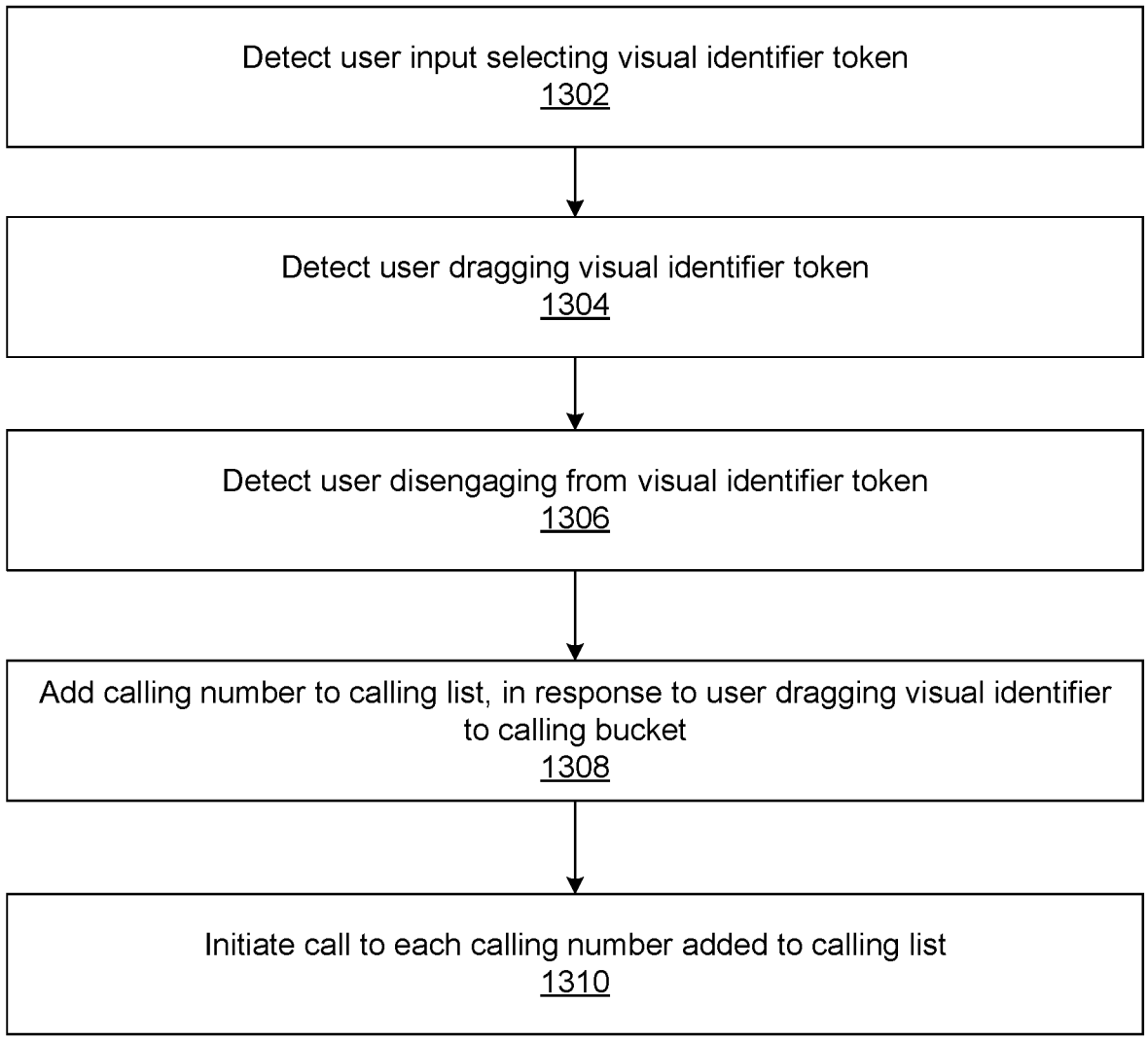
FIG. 13 illustrates an example method of initiating a call with an AR calling system.

FIG. 13 illustrates example method 1300 for initiating a call using an AR calling system. Method 1300 can be performed by a device that implements an AR calling system that is the same as or similar to the system described with reference to FIGS. 1-7. The device and AR calling system are referred to, collectively, as "the system." The device of the system for performing 1300 can include a touchscreen and can initiate a call between a user of the system and multiple call candidates.

At block 1302, the system detects a screen tap in a region of the touchscreen in which a visual identifier token is overlaid on an underlying screen image. At block 1304, the system detects the user dragging the visual identifier token. Optionally, the system can respond to the user's touch or dragging movement by increasing the size of the visual identifier token. Optionally, the system can modify the visual identifier token to include information relating to the call candidate identified by the visual identifier token. At block 1306, the system detects when the user disengages from the visual identifier token, that is, when the touch point on the touchscreen is removed from the touchscreen surface. At block 1308, the system determines when the user has dragged the visual identifier into a region of the screen allocated to a calling bucket and in response adds a calling number corresponding to the call candidate associated with the visual identifier token to a calling list. The user can repeat the procedure, adding additional call candidates to a prospective call by dragging and dropping in the calling bucket other visual identifier tokens corresponding to the additional call candidates. At block 1310, the system initiates a call by successively adding call candidates by calling each of the calling numbers on the calling list in response to user input of tapping a call button on the touchscreen.

FIG. 14 illustrates an example device 1400 in which an AR calling system such as system 100 can be implemented. Device 1400 includes one or more processors 1402 coupled to memory 1404 through interface circuitry 1406. Device 1400 stores computer readable instructions (also referred to as "program code") within memory 1404, which is an example of computer readable storage media. Processor(s) 1406 execute the program code accessed from memory 1404 via interface circuitry 1406.

Memory 1404 can include one or more physical memory devices such as local memory 1408 and bulk storage device 1410, for example. Local memory 1408 is implemented as one or more non-persistent memory device(s) generally used during actual execution of the program code. Local memory 1408 is an example of a runtime memory. Examples of local memory 1408 include any of the various types of RAM suitable for use by a processor for executing program code. Bulk storage device 1410 is implemented as a persistent data storage device. Examples of bulk storage device 1410 include a hard disk drive (HDD), a solid-state drive (SSD), flash memory, a read-only memory (ROM), an erasable programmable read-only memory (EPROM), electrically erasable programmable read-only memory (EEPROM), or other suitable memory. Device 1400 can also include one or more cache memories (not shown) that provide temporary storage of at least some program code in order to reduce the number of times program code must be retrieved from a bulk storage device during execution.

Examples of interface circuitry 1406 include, but are not limited to, an input/output (I/O) subsystem, an I/O interface, a bus system, and a memory interface. For example, interface circuitry 1406 can be implemented as any of a variety of bus structures and/or combinations of bus structures including a memory bus or memory controller, a peripheral bus, an accelerated graphics port, and a processor or local bus.

In one or more example implementations, processor(s) 1402, memory 1404, and/or interface circuitry 1406 are implemented as separate components. Processor(s) 1402, memory 1404, and/or interface circuitry 1406 may be integrated in one or more integrated circuits. The various components in device 1400, for example, can be coupled by one or more communication buses or signal lines (e.g., interconnects and/or wires). Memory 1404 may be coupled to interface circuitry 1406 via a memory interface, such as a memory controller or other memory interface (not shown).

Device 1400 can include one or more displays. Illustratively, for example, device 1400 includes display 1412 (e.g., a screen). Display 1412 can be implemented as a touchscreen display capable of receiving touch input from a user. A touchscreen is a touch-sensitive display and/or a touch-sensitive pad that is capable of detecting contact, movement, gestures, and breaks in contact using any of a variety of available touch sensitivity technologies. Example touch-sensitive technologies include, but are not limited to, capacitive, resistive, infrared, and surface acoustic wave technologies, and other proximity sensor arrays or other elements for determining one or more points of contact with a touch-sensitive display and/or device.

Device 1400 can include camera subsystem 1414. Camera subsystem 1414 can be coupled to interface circuitry 1406 directly or through a suitable input/output (I/O) controller. Camera subsystem 1414 can be coupled to optical sensor 1416. Optical sensor 1416 can be implemented using any of a variety of technologies. Examples of optical sensor 1416 can include, but are not limited to, a charged coupled device (CCD) or a complementary metal-oxide semiconductor (CMOS) optical sensor. Camera subsystem 1414 and optical sensor 1416 are capable of performing camera functions such as recording or capturing images and/or recording video. Specifically, camera subsystem 1414 can comprise a depth camera having time-of-flight (ToF) or light detection and ranging (LiDAR) sensor, which are particularly suited for performing the aforementioned camera functions.

Device 1400 can include an audio subsystem 1418. Audio subsystem 1418 can be coupled to interface circuitry 1406 directly or through a suitable input/output (I/O) controller. Audio subsystem 1418 can be coupled to a speaker 1420 and a microphone 1422 to facilitate voice-enabled functions, such as voice recognition, voice replication, digital recording, and telephony functions.

Device 1400 can include one or more wireless communication subsystems 1424. Each of wireless communication subsystem(s) 1424 can be coupled to interface circuitry 1406 directly or through a suitable I/O controller (not shown). Each of wireless communication subsystem(s) 1424 is capable of facilitating communication functions. Examples of wireless communication subsystems 1424 can include, but are not limited to, radio frequency receivers and transmitters, and optical (e.g., infrared) receivers and transmitters. The specific design and implementation of wireless communication subsystem 1424 can depend on the particular type of device 1400 implemented and/or the communication network(s) over which device 1400 is intended to operate.

As an illustrative and non-limiting example, wireless communication subsystem(s) 1424 may be designed to operate over one or more mobile networks, WiFi networks, short range wireless networks (e.g., a Bluetooth, UWB), and/or any combination of the foregoing. Wireless communication subsystem(s) 1424 can implement hosting protocols such that device 1400 can be configured as a base station for other wireless devices.

Device 1400 may include one or more sensors 1426, each of which can be coupled to interface circuitry 1406 directly or through a suitable I/O controller (not shown). Examples of sensor(s) 1426 that can be included in device 1400 include, but are not limited to, a motion sensor, a light sensor, and a proximity sensor to facilitate orientation, lighting, and proximity functions, respectively, of device 1400. Other examples of sensors 1426 can include, but are not limited to, an inertial measurement unit (IMU), a location sensor (e.g., a GPS receiver and/or processor) capable of providing geo-positioning sensor data, an electronic magnetometer (e.g., an integrated circuit chip) capable of providing sensor data that can be used to determine the direction of magnetic North for purposes of directional navigation, an accelerometer capable of providing data indicating change of speed and direction of movement of device 1400 in 3D, and an altimeter (e.g., an integrated circuit) capable of providing data indicating altitude.

Device 1400 further may include one or more input/output (I/O) devices 1428 coupled to interface circuitry 1406. I/O device(s) 1428 can be coupled to interface circuitry 1406 either directly or through intervening I/O controllers (not shown). Examples of I/O devices 1428 include, but are not limited to, a track pad, a keyboard, a display device, a pointing device, one or more communication ports (e.g., Universal Serial Bus (USB) ports), a network adapter, and buttons or other physical controls. A network adapter refers to circuitry that enables device 1400 to become coupled to other systems, computer systems, remote printers, and/or remote storage devices through intervening private or public networks. Modems, cable modems, Ethernet interfaces, and wireless transceivers not part of wireless communication subsystem(s) 1424 are examples of different types of network adapters that may be used with device 1400. One or more of I/O devices 1428 may be adapted to control functions of one or more or all of sensors 1426 and/or one or more of wireless communication sub system(s) 1424.

Memory 1404 stores program code. Examples of program code include, but are not limited to, routines, programs, objects, components, logic, and other data structures. For purposes of illustration, memory 1404 stores an operating system 1430 and application(s) 1432. In addition, memory 1404 can store AR calling system program code 1434 and an image rendering engine 1436, as described within this disclosure.

In an aspect, operating system 1430 implemented in executable program code is executed by device 1400 and, more particularly, by processor(s) 1402, as are applications 1432 and AR calling system program code 1434. As such, operating system 1430, application(s) 1432 and AR calling system program code 1434 may be considered an integrated part of device 1400. Further, it should be appreciated that any data and/or program code used, generated, and/or operated upon by device 1400 (e.g., processor(s) 1402) are functional data structures that impart functionality when employed as part of device 1400.

Device 1400 is provided for purposes of illustration and not limitation. A device and/or system configured to perform the operations described herein can have a different architecture than illustrated in FIG. 14. The architecture can be a simplified version of the architecture described in connection with FIG. 14 that includes a memory capable of storing instructions and a processor capable of executing instructions. In this regard, device 1400 may include fewer components than shown or additional components not illustrated in FIG. 14 depending upon the particular type of device that is implemented. In addition, the particular operating system and/or application(s) included can vary according to device type as can the types of I/O devices included. Further, one or more of the illustrative components can be incorporated into, or otherwise form a portion of, another component. For example, a processor may include at least some memory.

Device 1400 can be implemented as a data processing system, a communication device, or other suitable system that is suitable for storing and/or executing program code. Device 1400 can be implemented as an edge device. Example implementations of device 1400 can include, but are not to limited to, a smart phone or other mobile device or phone, or a wearable computing device.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer readable storage media. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, "real-time" means a level of processing responsiveness that a user or system senses as sufficiently immediate for a particular process or determination to be made, or that enables the processor to keep up with some external process.

As defined herein, the term "responsive to" and similar language as described above, e.g., "if," "when," or "upon," mean responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms "user," "person," "individual," and "call candidate" refer to a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A wireless calling method, comprising:
   detecting, by a device, an advertising signal from a nearby device over a first short-range wireless network;
   in response to detecting the advertising signal via the first short-range wireless network, establishing, by the device, a session with the nearby device over a second short-range wireless network different from the first short-range wireless network;
   determining, with the device, a position of the nearby device based on signals corresponding to the second short-range wireless network from the nearby device as received by the device during the session;
   capturing, with a camera of the device, an image of an area near the device;
   responsive to identifying an image of a call candidate appearing within the image of the area, determining, from the image of the area, a position of the call candidate relative to the device by converting pixel coordinates of the image of the call candidate to physical coordinates of the call candidate;
   associating the nearby device with the call candidate by correlating the position of the call candidate with the position of the nearby device based on a proximity of the position of the call candidate to the position of the nearby device;
   retrieving information associated with the call candidate based on the correlating; and
   generating, based on the information, a visual identifier token corresponding to the call candidate, wherein the visual identifier token is presented on a display of the device to enable a user to initiate a call between the device and the nearby device.

2. The method of claim 1, wherein the method includes:
   initially capturing a first image of a first area near the device;
   determining the position of the nearby device is outside the first area; and presenting on the display of the device an indicator indicating the position of the nearby device with respect to a viewpoint of the first image.

3. The method of claim 1, wherein the visual identifier token is presented on the display as an overlay adjacent to the image of the call candidate and includes selected portions of the information associated with the call candidate.

4. The method of claim 1, wherein the first short-range wireless network is a Bluetooth short-range wireless network and the second short-range wireless network is an Ultra-Wide Band short-range wireless network.

5. The method of claim 1, wherein the call candidate comprises a plurality of call candidates and the nearby device comprises a plurality of nearby devices, and wherein the method includes:
 initiating a group call from the device with selected nearby devices of the plurality of nearby devices associated with two or more user selected visual identifier tokens; and
 filtering, by the device, the plurality of call candidates once the group call is established by rendering on the display of the device the visual identifier token of each call candidate on the group call that is speaking to indicate which of the call candidates on the group call are speaking.

6. The method of claim 1, wherein the call candidate comprises a plurality of call candidates and the nearby device comprises a plurality of nearby devices, and wherein the method includes:
 presenting visual identifier tokens on the display of the device, each visual identifier token corresponding to one of the plurality of call candidates;
 selecting two or more of the visual identifier tokens corresponding to the plurality of call candidates and adding the two or more of the visual identifier tokens to a calling bucket presented on the display of the device; and
 initiating a group call between the device and each nearby device associated with the two or more of the visual identifier tokens added to the calling bucket.

7. The method of claim 1, wherein the call candidate comprises a plurality of call candidates and the nearby device comprises a plurality of nearby devices, and wherein the method includes:
 generating a subset of call candidates by filtering the plurality of call candidates based on distance of each of the plurality of nearby devices associated with each of the call candidates to the device;
 presenting visual identifier tokens on the display of the device, each visual identifier token corresponding to the subset of call candidates;
 selecting two or more of the visual identifier tokens corresponding to the subset of call candidates and adding the two or more of the visual identifier tokens to a calling bucket presented on the display of the device; and
 initiating a group call between the device and each device associated with the two or more of the visual identifier tokens.

8. The method of claim 1, wherein the method includes:
 cross-referencing the image of the call candidate against a collection of photographs electronically stored on the device; and
 identifying the call candidate based on facial recognition locally performed by the device, wherein the identifying is in response to matching the image of the call candidate with another image of the call candidate appearing in one or more of the photographs.

9. The method of claim 1, wherein the call candidate comprises a plurality of call candidates and the nearby device comprises a plurality of nearby devices, and wherein the method includes:
 presenting visual identifier tokens on the display of the device, each visual identifier token corresponding to one of the plurality of call candidates; and
 varying a size of each visual identifier token as displayed on the display of the device based on a distance between the device and each respective and corresponding call candidate.

10. A system, comprising:
 a display; and
 a processor coupled to the display, wherein the display and processor are disposed in a device, and wherein the processor is configured to initiate operations including:
  detecting, by the device, an advertising signal from a nearby device over a first short-range wireless network;
  in response to detecting the advertising signal via the first short-range wireless network, establishing, by the device, a session with the nearby device over a second short-range wireless network different from the first short-range wireless network;
  determining, with the device, a position of the nearby device based on signals corresponding to the second short-range wireless network from the nearby device as received by the device during the session;
  capturing, with a camera of the device, an image of an area near the device;
  responsive to identifying an image of a call candidate appearing within the image of the area, determining, from the image of the area, a position of the call candidate relative to the device by converting pixel coordinates of the image of the call candidate to physical coordinates of the call candidate;
  associating the nearby device with the call candidate by correlating the position of the call candidate with the position of the nearby device based on a proximity of the position of the call candidate to the position of the nearby device;
  retrieving information associated with the call candidate based on the correlating; and
  generating, based on the information, a visual identifier token corresponding to the call candidate, wherein the visual identifier token is presented on the display to enable a user to initiate a call between the device and the nearby device.

11. The system of claim 10, wherein the processor is configured to initiate operations including:
 initially capturing a first image of a first area near the device;
 determining the position of the nearby device is outside the first area; and
 presenting on the display of the device an indicator indicating the position of the nearby device with respect to a viewpoint of the first image.

12. The system of claim 10, wherein the visual identifier token is presented on the display as an overlay adjacent to the image of the call candidate and includes selected portions of the information associated with the call candidate.

13. The system of claim 10, wherein the first short-range wireless network is a Bluetooth short-range wireless network and the second short-range wireless network is an Ultra-Wide Band short-range wireless network.

14. The system of claim 10, wherein the call candidate comprises a plurality of call candidates and the nearby device comprises a plurality of nearby devices, and wherein the processor is configured to initiate operations including:
- initiating a group call from the device with selected nearby devices of the plurality of nearby devices associated with two or more user selected visual identifier tokens; and
- filtering, by the device, the plurality of call candidates once the group call is established by rendering on the display of the device the visual identifier token of each call candidate on the group call that is speaking to indicate which of the call candidates on the group call are speaking.

15. The system of claim 10, wherein the call candidate comprises a plurality of call candidates and the nearby device comprises a plurality of nearby devices, and wherein the processor is configured to initiate operations including:
- presenting visual identifier tokens on the display of the device, each visual identifier token corresponding to one of the plurality of call candidates;
- selecting two or more of the visual identifier tokens corresponding to the plurality of call candidates and adding the two or more of the visual identifier tokens to a calling bucket presented on the display of the device; and
- initiating a group call between the device and each nearby device associated with the two or more of the visual identifier tokens added to the calling bucket.

16. The system of claim 10, wherein the call candidate comprises a plurality of call candidates and the nearby device comprises a plurality of nearby devices, and wherein the processor is configured to initiate operations including:
- generating a subset of call candidates by filtering the plurality of call candidates based on distance of each of the plurality of nearby devices associated with each of the call candidates to the device;
- presenting visual identifier tokens on the display of the device, each visual identifier token corresponding to the subset of call candidates;
- selecting two or more of the visual identifier tokens corresponding to the subset of call candidates and adding the two or more of the visual identifier tokens to a calling bucket presented on the display of the device; and
- initiating a group call between the device and each device associated with the two or more of the visual identifier tokens.

17. The system of claim 10, wherein the processor is configured to initiate operations including:
- cross-referencing the image of the call candidate against a collection of photographs electronically stored on the device; and
- identifying the call candidate based on facial recognition locally performed by the device, wherein the identifying is in response to matching the image of the call candidate with another image of the call candidate appearing in one or more of the photographs.

18. The system of claim 10, wherein the call candidate comprises a plurality of call candidates and the nearby device comprises a plurality of nearby devices, and wherein the processor is configured to initiate operations including:
- presenting visual identifier tokens on the display of the device, each visual identifier token corresponding to one of the plurality of call candidates; and
- varying a size of each visual identifier token as displayed on the display of the device based on a distance between the device and each respective and corresponding call candidate.

19. A computer program product, comprising:
one or more computer readable storage media, and program instructions collectively stored on the one or more computer readable storage media, wherein the program instructions are executable by computer hardware of a device to initiate operations including:
- detecting, by the device, an advertising signal from a nearby device over a first short-range wireless network;
- in response to detecting the advertising signal via the first short-range wireless network, establishing, by the device, a session with the nearby device over a second short-range wireless network different from the first short-range wireless network;
- determining, with the device, a position of the nearby device based on signals corresponding to the second short-range wireless network from the nearby device as received by the device during the session;
- capturing, with a camera of the device, an image of an area near the device;
- responsive to identifying an image of a call candidate appearing within the image of the area, determining, from the image of the area, a position of the call candidate relative to the device by converting pixel coordinates of the image of the call candidate to physical coordinates of the call candidate;
- associating the nearby device with the call candidate by correlating the position of the call candidate with the position of the nearby device based on a proximity of the position of the call candidate to the position of the nearby device;
- retrieving information associated with the call candidate based on the correlating; and
- generating, based on the information, a visual identifier token corresponding to the call candidate, wherein the visual identifier token is presented on a display of the device to enable a user to initiate a call between the device and the nearby device.

20. The computer program product of claim 19, wherein the call candidate comprises a plurality of call candidates and the nearby device comprises a plurality of nearby devices, and wherein the program instructions are executable by the computer hardware to initiate operations including:
- initiating a group call from the device with selected nearby devices of the plurality of nearby devices associated with two or more user selected visual identifier tokens; and
- filtering, by the device, the plurality of call candidates once the group call is established by rendering on the display of the device the visual identifier token of each call candidate on the group call that is speaking to indicate which of the call candidates on the group call are speaking.

* * * * *